United States Patent [19]

Kubota et al.

[11] Patent Number: 5,332,173
[45] Date of Patent: Jul. 26, 1994

[54] MAGNETIC TAPE CARTRIDGE HAVING RETENTION OF LEADER TAPE

[75] Inventors: Kazuo Kubota; Hideki Uchikura; Hiroshi Ozawa, all of Kanagawa, Japan

[73] Assignee: Fuji Photo Film Co., Ltd., Kanagawa, Japan

[21] Appl. No.: 961,336

[22] Filed: Oct. 15, 1992

[30] Foreign Application Priority Data

Oct. 15, 1991 [JP] Japan ............................ 3-091895[U]

[51] Int. Cl.$^5$ ............................ G11B 3/68; G11B 5/84
[52] U.S. Cl. ............................ 242/348.300; 360/134
[58] Field of Search ............... 242/195, 197; 360/134; 206/400

[56] References Cited

U.S. PATENT DOCUMENTS 3,695,553 10/1972 Everett ............................ 360/134
4,333,619 6/1982 Schoettle et al. ............... 242/195

Primary Examiner—Daniel P. Stodola
Assistant Examiner—John Q. Nguyen
Attorney, Agent, or Firm—Sughrue, Mion, Zinn, Macpeak & Seas

[57] ABSTRACT

A magnetic tape cartridge in which, to provide a connection between a magnetic tape and a leader tape, any additional steps which lower the productivity, such as the step of using an adhesive, are avoided, the manufacturing process is almost the same as a conventional process, and a positive connection between the leader tape and the magnetic tape is ensured. A single reel having a magnetic tape wound thereon is housed in the cartridge, and a leader tape is connected to an end of the magnetic tape, wherein the leader tape can be drawn out from an opening of the cartridge by a tape-drawing device of a recording/reproducing unit to enable tape travel. The magnetic tape and the leader tape are connected together through a splicing tape, and the length of that portion of the splicing tape bonded to the leader tape is longer than the length of winding of the tape around a guide roller provided in the tape travel path in the recording/reproducing device which changes a direction of said tape travel path at a sharpest angle along said tape travel path.

2 Claims, 5 Drawing Sheets

TENSILE STRENGTH OF LEADER
TAPE AND SPLICING TAPE
PRIOR ART

TENSILE STRENGTH OF LEADER
TAPE AND SPLICING TAPE

MAGNETIC TAPE CARTRIDGE HAVING RETENTION OF LEADER TAPE

BACKGROUND OF THE INVENTION

The present invention relates to a magnetic tape cartridge, and more particularly to a magnetic tape cartridge of the type employing a single reel having a magnetic tape wound thereon, and wherein a leader tape at the end of the wound tape is used to draw the magnetic tape from a tape-drawing opening formed in the housing of the tape cartridge by a tape-drawing device of a recording/reproducing unit, thereby causing the tape to run along a tape travel path in the recording/reproducing unit so as to allow information to be read from and written onto the tape.

In a conventional magnetic tape cartridge used as a recording medium for a computer or the like, a magnetic tape is wound on a single reel, and this reel is rotatably housed in a cartridge case composed of an upper cartridge half and a lower cartridge half.

When this magnetic cartridge is in use, the magnetic tape is drawn out from an opening in the cartridge case. When the cartridge is not in use, the magnetic tape is completely wound on the reel, the leader tape (by which the tape is extracted from the cartridge to introduce the magnetic tape into the tape travel path) is retained at an end surface of the cartridge case, the reel is locked against accidental rotational movement by a suitable lock device such as a reel brake, and the tape opening is closed by a lid.

Because important information is stored in such a magnetic tape cartridge, the cartridge must be constructed so as to prevent the magnetic tape from being accidentally drawn out of the cartridge. Cutting and jamming of the tape are further potential problems that must be prevented. Specifically, the reel brake is used to prevent rotation of the reel as described above, and a splicing tape having a high bonding force is used for connecting the magnetic tape and the leader tape in locations where tape cutting is particularly prone to occur.

With respect to dimensional standards for the above splicing tape, industry standards require that the overall thickness be not more than 28.38 μm, the substrate thickness be not more than 23.3 μm, the bonding layer thickness be not more than 5.08 μm, with the length of the splicing tape be in the range of 11,811 mm to 20.32 mm. With respect to the bonding strength of the splicing tape, there is required an adhesive force not less than 190.3 g/12.2 mm, and as to the required holding force, the splicing tape joining the magnetic tape and the leader tape together must withstand a tensile strength of 2.27 kg (5 pounds) for not less than 60 seconds.

Conventionally, bonding of the splicing tape has been carried out in the manner illustrated in FIG. 7. Namely, the splicing tape 22 with an overall length $L_0$ has substantially equal right and left lengths $L_2$ and $L_1$, measured with respect to a tape abutting position C at which a magnetic tape 20 and a leader tape 21 are joined. The length of the splicing tape 22 is, for example, 14 mm or 20 mm. With these values, the above standards are sufficiently satisfied, even if the above bonding method is employed. Generally, the temperature and humidity of a room in which a computer is installed are considerably strictly controlled, and under such conditions it has been thought that the above-described tape cartridge is satisfactory.

However, during long-term use of such a magnetic tape cartridge, the cartridge may not always be used only in a good environment, and the leader tape 21 and the magnetic tape 20, though rarely, sometimes have been separated or cut from each other at the splicing tape 22.

An extensive study has been made in an attempt to uncover the cause of this problem, and as a result it has been found that the problem is attributable to the construction of the tape travel path in the recording/reproducing device. Namely, several guide rollers 60, as shown in FIG. 8, are provided the tape travel path, and when the splicing tape 22 is contact with the guide roller 60, as also shown in FIG. 8, the leader tape 22 sometimes does not curve properly along the outer periphery of the guide roller 60, but is rendered straight, thus causing it to separate from the splicing tape 22.

The maximum angle $\theta$ winding around the guide roller reaches 75 degrees. The leader tape 21 is made, for example, of polyethylene terephthalate, and has a thickness of 0.188±0.0188 mm. It has been thought that if the temporary spring-back force of the leader tape 21 (which has a greater rigidity than the magnetic tape 20) against the bonding force meets the above conventional standards, there would be no danger separation and the cartridge would operate satisfactorily; however, nevertheless, peeling has sometimes occurred.

Since the maximum length of the splicing tape 22 is limited by the above standard, it might be thought that this problem could still easily be overcome by the use of a splicing tape having a greater bonding force. However, as a practical matter, there is not currently available on the market a splicing tape having a better bonding ability than those now in use, and to develop a slicing tape having a greater bonding strength requires very much time and expense and would likely incur an increased manufacturing cost. Therefore, in has generally not been possible to solve the above problem by increasing the bonding force of the splicing tape.

Also, it might be considered to use an adhesive to avoid the above-mentioned peeling. However, if an adhesive is used, additional steps are needed, such as cutting of the splicing tape and coating of the adhesive, which not only lowers productivity but also invites additional problems such as squeezing-out of the adhesive along the edges of the tape. This would significantly lower the yield rate.

SUMMARY OF THE INVENTION

It is therefore an object of the invention to provide a magnetic tape cartridge in which in the connection between a magnetic tape and a leader tape is improved, additional steps which lower productivity, such as a step of applying an adhesive, are avoided, the manufacturing process is substantially the same as a conventional process, and a positive connection between the leader tape and the magnetic tape is ensured.

The above and other objects have been achieved by a magnetic tape cartridge wherein a single reel having a magnetic tape wound thereon is housed in the cartridge, a leader tape is connected to an end of the magnetic tape, and the leader tape can be drawn out from an opening of in the cartridge by a tape-drawing device of a recording/reproducing unit to enable tape travel, wherein the magnetic tape and the leader tape are connected together through a splicing tape, and the length of that portion of the splicing tape bonded to the leader tape is made longer than the length of winding of the tape around a guide roller provided in a tape travel path in the recording/reproducing unit, which guide roller is the guide roller contacted with the splicing tape which changes the direction of tape travel path at the sharpest angle.

DESCRIPTION OF THE PREFERRED EMBODIMENTS

Figure 3:
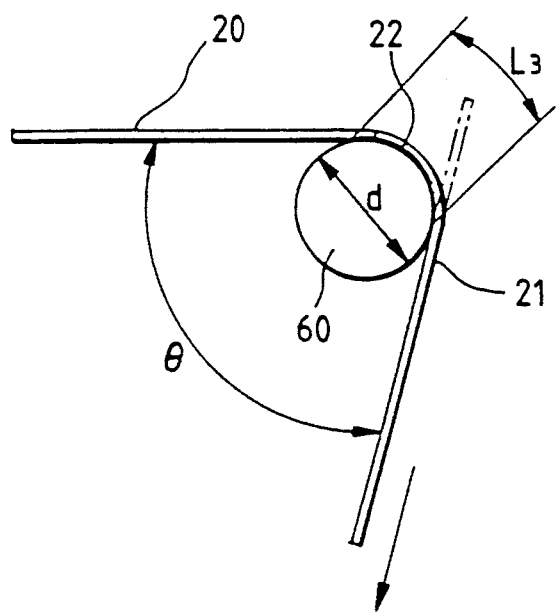
FIG. 3 is a schematic plan view showing the manner of travel of a splicing tape around a guide roller.

A preferred embodiment of the present invention will now be described with reference to FIGS. 1 to 3.

Figure 2:
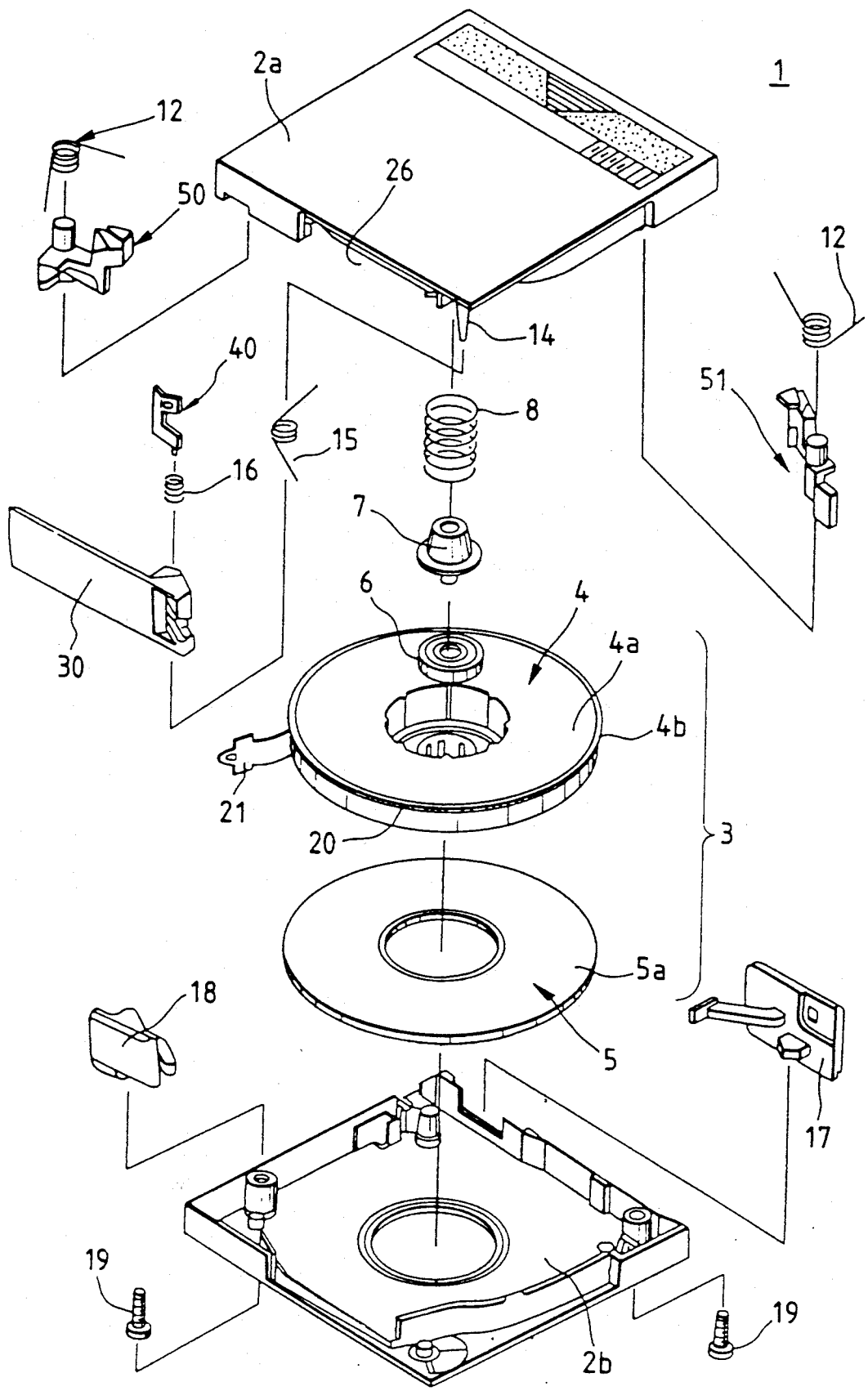
FIG. 2 is an exploded perspective view showing the overall construction of the magnetic tape cartridge of the invention.

FIG. 2 shows the overall construction of a magnetic tape cartridge, but it is to be understood that the present invention is not limited to this particular embodiment.

The magnetic tape cartridge 1 shown in FIG. 2 includes a single reel 3 composed of an upper reel half 4 and a lower reel half 5 joined together, for example, by ultrasonic welding. A magnetic tape 20 is wound on the reel 3. The reel 3 is rotatably housed in a cartridge case composed of an upper cartridge case half 2a and a lower cartridge case half 2b fastened together by screws 19.

The upper reel half 4 of the reel 3 has an upper flange 4a, and a recess is formed in the central portion thereof. A gear portion 4b is formed on the outer periphery of the upper flange 4a. A ring-like bearing 6 is press-fitted in and fixed to circularly arranged ribs in the above recess, and a spring plug 7 is press-fitted in and fixed to a central hole of the bearing. A reel spring 8 is attached to the spring plug 7 to urge the reel 3 downward and also to rotatably hold the reel.

When the cartridge is not in use, the reel 3 is retained against accidental rotational movement by reel brakes 50 and 51 suitably biased by brake torsion springs 12. When the magnetic tape cartridge 1 is not in use, the magnetic tape 20 is completely wound on the reel 3, and a leader tape 21 (by which the magnetic tape 20 is extracted from the cartridge and the tape is introduced into a tape travel path) is retained on a distal end of a hook 18 provided adjacent to one side of the cartridge.

A lid 30, which is openable in the direction of the plane of the cartridge, is provided at an opening from which the magnetic tape 20 is extracted, the lid 30 being suitably biased by a lid-urging torsion spring 15. When the cartridge is not in use, the lid 30 is held against angular movement by a lock member 40 suitably urged by a compression spring 16. A write protector 17 is provided at the side remote from the lid 30.

Figure 1:
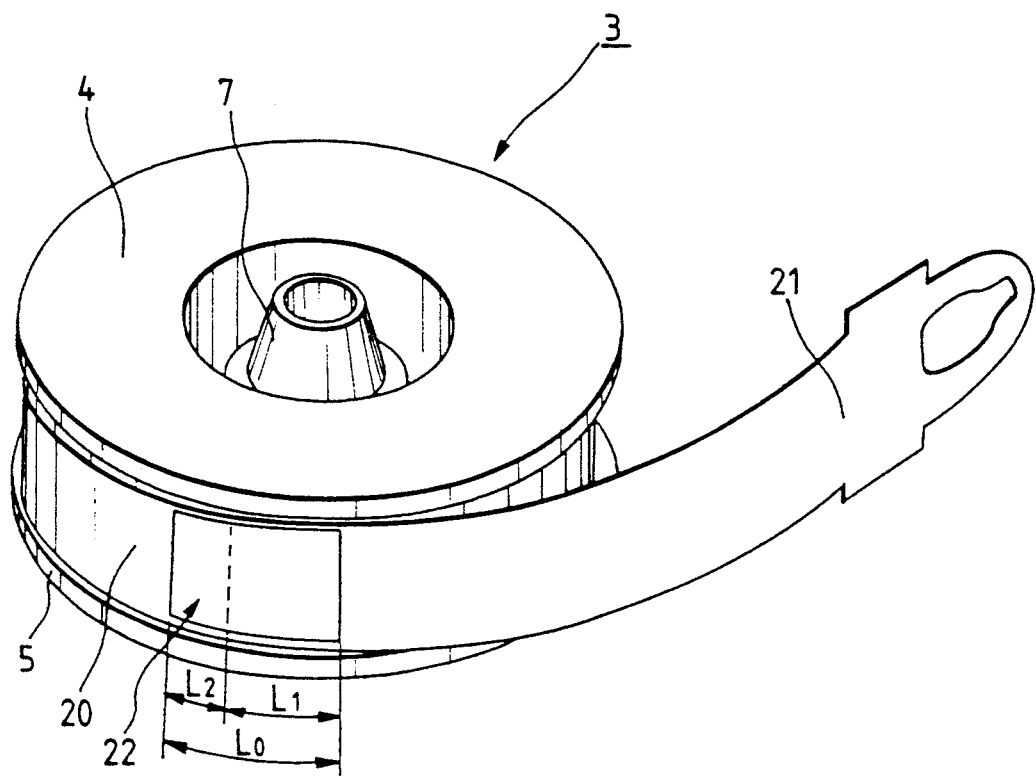
FIG. 1 is a schematic perspective view of an important portion of a magnetic tape cartridge according to the present invention.

The leader tape 21 for engagement with an engagement device for introducing the magnetic tape 20 into a tape path of a recording/reproducing unit is connected to the magnetic tape 20, for example, by a splicing tape 22 (see FIG. 1).

The splicing tape 22 will now be described.

As shown in FIG. 1, the magnetic tape 20 and the leader tape 21 are connected together through the splicing tape 22. The length $L_1$ of that portion of the splicing tape 22 bonded to the leader tape 21 is longer than the length $L_3$ (see FIG. 3) of winding of the tape around each of guide rollers 60 (see FIG. 3) provided in the tape travel path in the recording/reproducing unit (not shown).

The effect obtained with this construction will now be described.

As described above, several guide rollers 60 are provided in the tape travel path. It is here assumed that when the splicing tape 22 is in contact with the guide roller 60, the leader tape 21 is not curved along the outer peripheral surface of the guide roller 60, but is sprung back straight, as indicated in phantom in FIG. 3. In this condition, the splicing tape 22 is not completely separated from the leader tape 21, but a connected portion remains although such connected portion is short in length. Since the tape continues to travel in this condition, the splicing tape 22 and the leader tape 21 once separated are again kept parallel to each other, or are held in contact with each other. Then, when these tapes are wound on a reel in the recording/reproducing unit, they are pressed in the direction of the thickness of the tape so that the splicing tape 22 and the leader tape 21 are again firmly connected together.

With this construction, the maximum angle $\theta$ of winding around the guide roller 60 reaches 75 degrees, and even if the leader tape 21, which is generally greater in rigidity than the magnetic tape 20, temporarily springs back against the bonding force, the tape is prevented from being cut.

In this embodiment, if the diameter d of the guide roller 60 is 15 mm, and the lap angle $\theta$ is 75 degrees, the above effect is produced when the value of $L_1$ is not less than 13.74 mm. Therefore, if the overall length L of the splicing tape 22 is, for example, 20 mm, then the length $L_1$ of that portion of the tape in contact with the leader tape 21 can be 14 mm, and the length $L_2$ of that portion in contact with the magnetic tape 20 can be 6 mm.

By thus shifting the position of bonding of the splicing tape 22 in accordance with the present invention, the instantaneous bonding strength obtained when the splicing tape 22 is positioned at the guide roller 60 can be markedly increased.

Figure 4:
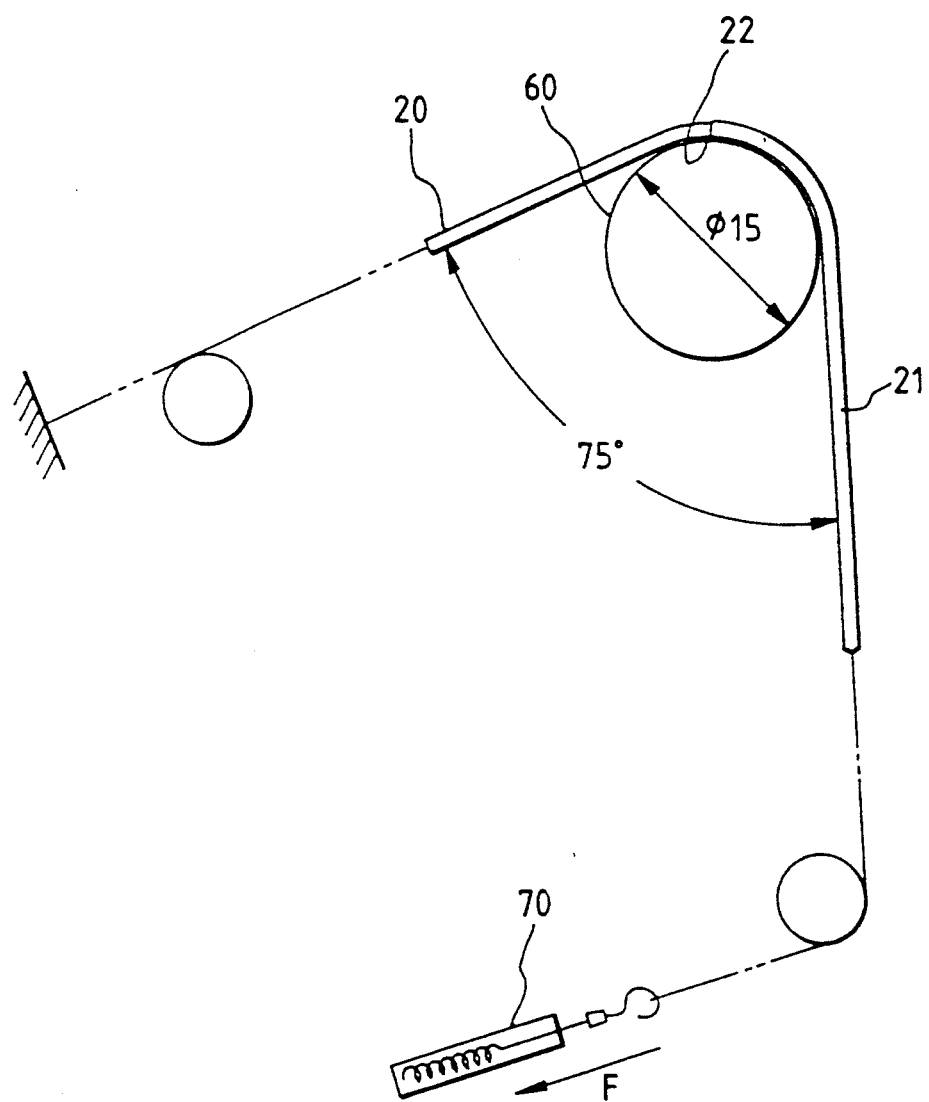
FIG. 4 is a schematic plan view of an apparatus for measuring a tensile strength of a bonded portion of the splicing tape.

The invention was tested using an apparatus as shown in FIG. 4. In the apparatus shown in FIG. 4, the splicing tape is positioned at a roller 60a similar to the guide roller 60, the magnetic tape 20 is fixed, and a weighting instrument 70 is attached to the leader tape 21 and then pulled.

Using the above apparatus, a test was conducted under the following conditions:

The splicing tapes 22 were type no. 326 manufactured by Nitto Denko Co. Each splicing tape 22 had a width of 12.2 mm and an overall length of 20 mm. The test was conducted at room temperature and ordinary humidity with respect to one group in which equal lengths (each 10 mm) of the splicing tape were bonded to the magnetic tape and the leader tape (results shown in FIG. 5), and also with respect to another group in which, in accordance with the invention, one length (14 mm) of the splicing tape was bonded to the leader tape whereas a different length (6 mm) was bonded to the magnetic tape (results in FIG. 6). The substrate of the magnetic tape 20 was made of polyethylene terephthalate, and had a thickness of 0.01 mm and width of 12.65 mm. The splicing tape 22 was made of polyethylene terephthalate, and had a thickness of 0.02 mm and a width of 12.2 mm. The number of samples in each group was 20. The results are shown in FIGS. 5 and 6.

Figure 5:
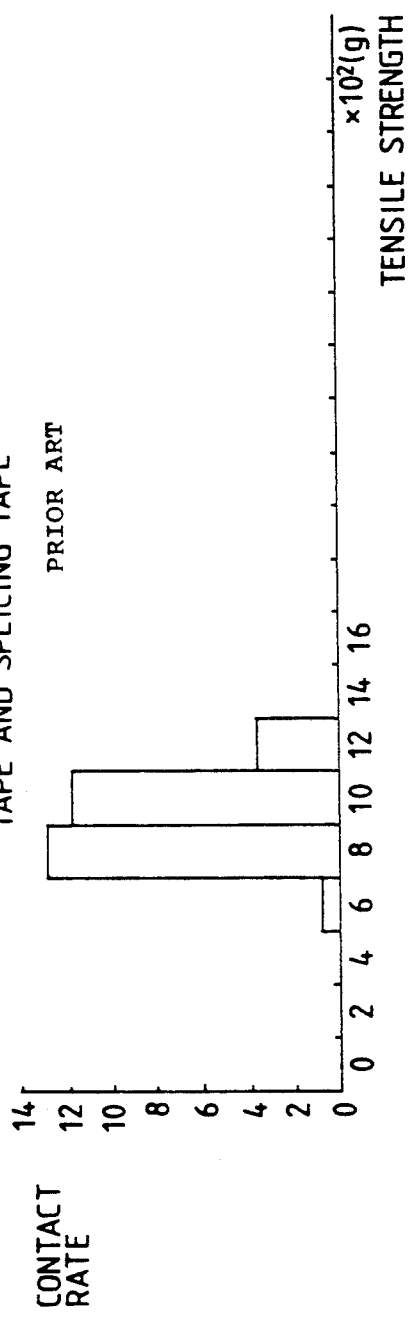
FIG. 5 is a graph showing the tensile strength of splicing tapes.
Figure 6:
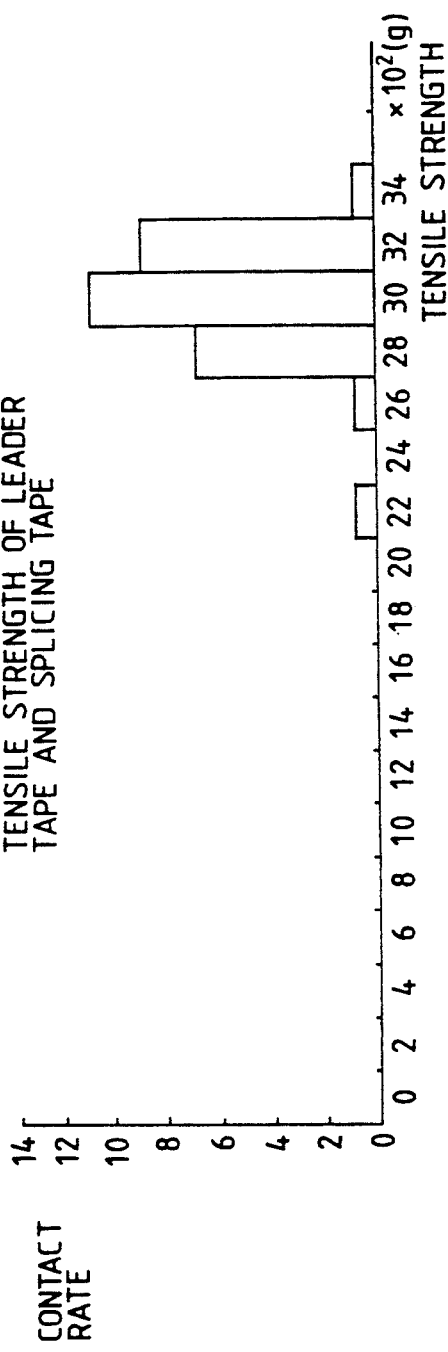
FIG. 6 is a graph showing the tensile strength of splicing tapes.
Figure 7:
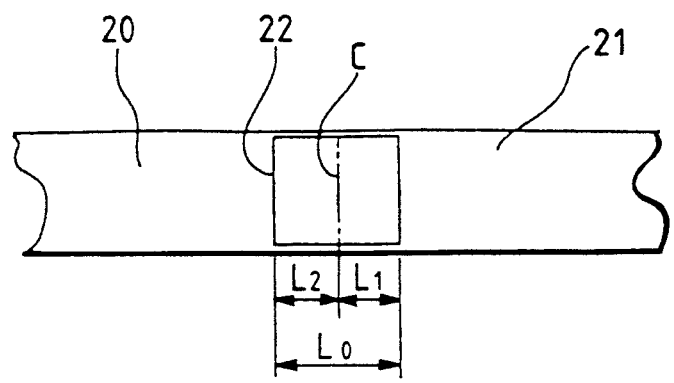
FIG. 7 is a plan view showing a bonded condition of a conventional splicing tape.
Figure 8:
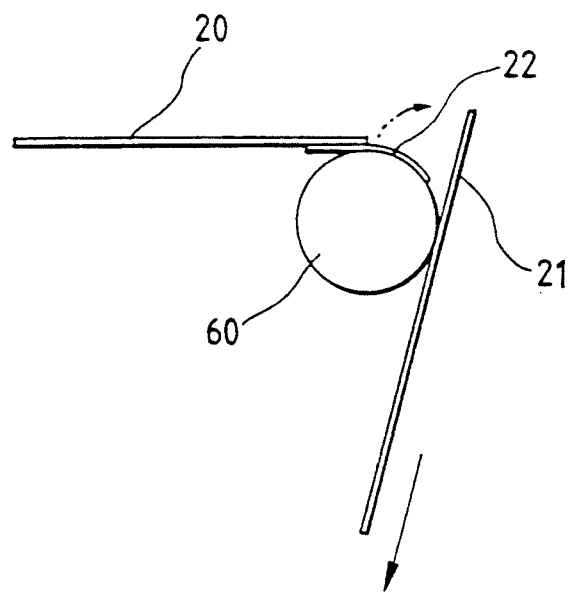
FIG. 8 is a schematic plan view showing a condition in which the conventional splicing tape is peeled from a leader tape.

As is clear from FIGS. 5 and 6, the tensile strength is about three times larger in the case of the present invention shown in FIG. 6 than in the prior art shown in FIG. 5.

As described above, in the magnetic tape cartridge according to the present invention, the magnetic tape and the leader tape are connected together through the splicing tape, and the length of that portion of the splicing tape bonded to the leader tape is longer than the length of winding of the tape around a guide roller provided in the tape travel path in the recording/reproducing unit, the guide roller being the roller which changes the direction of tape travel path at the sharpest angle.

Therefore, even when the direction of tape travel is abruptly changed at the guide roller, the splicing tape will not be completely separated from the leader tape, as could sometimes happen in the prior art, and the two tapes, when wound on the reel, are again pressed in the direction of the thickness of the tape so that the splicing tape and the leader tape are again firmly connected together, thereby preventing severing of the tape. Thus, according to the present invention, in the connection between the magnetic tape and the leader tape, no additional steps are required which lower productivity, such as a step of using an adhesive, and even though the manufacturing process is substantially the same as a conventional process, a positive connection between the leader tape and the magnetic tape is ensured.

What is claimed is:

1. In a magnetic tape cartridge wherein a single reel having a magnetic tape would thereon is housed in said cartridge, a leader tape is connected to an end of said magnetic tape, said leader tape can be drawn out from an opening of said cartridge by tape-drawing means of a recording/reproducing unit to enable tape travel along a tape travel path in said recording-reproducing unit defined by at a plurality of guide rollers, and said magnetic tape and said leader tape are connected together through a splicing tape, the improvement wherein a length of a portion of said splicing tape bonded to said leader tape is longer than a length of contact between said tape in said tape travel path and one of said guide rollers which changes a direction of said tape travel path at a sharpest angle along said tape travel path among said plurality of guide rollers.

2. The magnetic tape cartridge of claim 1, wherein said length of said portion of said splicing tape bonded to said leader tape is approximately 14 mm, and a length of said splicing tape bonded to said magnetic tape is approximately 6 mm.

* * * * *